(12) United States Patent
LaBanca et al.

(10) Patent No.: US 7,673,179 B2
(45) Date of Patent: Mar. 2, 2010

(54) ONLINE TESTING UNIFICATION SYSTEM WITH REMOTE TEST AUTOMATION TECHNOLOGY

(75) Inventors: John LaBanca, Norcross, GA (US); Winston Austria, Suwanee, GA (US)

(73) Assignee: LSI Corporation, Milpitas, CA (US)

( * ) Notice: Subject to any disclaimer, the term of this patent is extended or adjusted under 35 U.S.C. 154(b) by 957 days.

(21) Appl. No.: 11/052,434

(22) Filed: Feb. 7, 2005

(65) Prior Publication Data

US 2006/0179363 A1    Aug. 10, 2006

(51) Int. Cl.
*G06F 11/00* (2006.01)
(52) U.S. Cl. .............................. 714/38; 714/25; 714/57
(58) Field of Classification Search ................... 714/57, 714/46
See application file for complete search history.

(56) References Cited

U.S. PATENT DOCUMENTS

| | | | | |
|---|---|---|---|---|
| 5,805,795 | A * | 9/1998 | Whitten ........................ | 714/38 |
| 6,442,714 | B1 * | 8/2002 | Griffin et al. ................... | 714/46 |
| 6,611,865 | B1 * | 8/2003 | Perugini et al. .............. | 709/224 |
| 6,701,364 | B1 * | 3/2004 | Meyer ......................... | 709/224 |
| 6,732,296 | B1 * | 5/2004 | Cherny et al. .................. | 714/32 |
| 6,807,506 | B2 * | 10/2004 | Sutton et al. ................. | 702/123 |
| 6,973,417 | B1 * | 12/2005 | Maxwell et al. ................ | 703/2 |
| 7,055,067 | B2 * | 5/2006 | DiJoseph ..................... | 714/38 |
| 7,055,137 | B2 * | 5/2006 | Mathews ..................... | 717/125 |
| 7,299,382 | B2 * | 11/2007 | Jorapur ........................ | 714/38 |
| 2003/0226069 | A1 * | 12/2003 | Legatt ......................... | 714/46 |
| 2004/0107415 | A1 * | 6/2004 | Melamed et al. ............ | 717/124 |
| 2005/0204201 | A1 * | 9/2005 | Meenakshisundaram et al. .......................... | 714/38 |

* cited by examiner

*Primary Examiner*—Yolanda L Wilson
(74) *Attorney, Agent, or Firm*—Suiter Swantz pc llo (57) ABSTRACT

The present invention is directed to an online product validation solution integrating an online testing module configured to assist a user to create test cases and a remote test automation module configured to execute the created test cases on remote test systems. When a user creates a test plan, complete test coverage for the test plan may be ensured and cross-checked with product specifications stored in the knowledge database. Moreover, seamless integration of the online testing module and the remote test automation module may provide a uniform interface for generating both manual and automated test cases. Test case status is reported within the test plan in synchronicity with test case execution.

11 Claims, 8 Drawing Sheets

O.T.U.S.
Online Testing Unification System

| Step | Procedure | Expected Result | Status |
|---|---|---|---|
| 1 | Clear configuration on the controller | Controller configuration is cleared. | ✓ |
| 2 | Create 10 logical drives on a 3 disk RAID 5 array using the following properties:<br>Stripe size: 64k<br>Read policy: ADAPTIVE<br>Write policy: WRITE BACK<br>Cache policy: CACHED I/O<br>LARGE disks | Logical drives created successfully. | ✓ |
| 3 | Start an initialization on all logical drives and let it reach 100 percent. | Initialization starts on all logical drives. | ✓ |
| 4 | Loop through the following steps 3 times | Steps repeat 3 times | 🕐 |
| 5 | Print logical drive information to the screen. | Logical drive information is correct. | = |
| 6 | Delete the last logical drive. | Last logical drive is deleted. | = |
| 7 | Reboot the system | System reboots and returns to OS | = |
| 8 | Stop running steps in loop | Steps in loop completed without errors. | = |
| 9 | Print logical drive information to the screen. | Logical drive information is correct. | = |

Alarm - Disable
Alarm - Enable
Alarm - Silence
BGI - Abort
BGI - Progress
Check Consistency - Abort
Check Consistency - Progress
Check Consistency - Progress on all Logical Drives Session started 500
502

FIG._8

ONLINE TESTING UNIFICATION SYSTEM WITH REMOTE TEST AUTOMATION TECHNOLOGY

FIELD OF THE INVENTION

The present invention generally relates to the field of a computer software system and particularly to an online testing unification system with remote test automation technology.

BACKGROUND OF THE INVENTION

During design and development of a hardware or software product, manufacturers put great effort to assure desired quality of the hardware or software product. The production validation (quality assurance) process involves various activities such as test plan and management, test execution, defect report or the like. Extensive testing is often completed on the products to assure performance and that the products meet industry standards for hardware, software, and BIOS compatibility.

It is easy for testers to conduct improper tests or waste valuable resources during a product validation process. For example, testers perform tests manually by interpreting a set of predetermined procedures and recording their results with as much detail as they feel necessary. However, a set of manually recorded instructions does not guarantee that another tester can accurately duplicate and consistently record the test results. Sometimes, testers waste time by repeating simple but time-consuming tasks, allowing for the introduction of error.

Multiple test groups may be involved in the production validation process when various customers desire different features in the product. However, when multiple test groups service different customers, they hardly communicate with each other. Conventionally, each group maintains its own test results and procedures. Thus, the lack of shared knowledge among various test groups may cause redundancy between multiple test groups. Further, current test practices do not provide a central location for test results, often leading to lost or misinterpreted results.

Therefore, it would be desirable to provide a centralized system that maintains a shared knowledge database, records history of specific testing practices, and prevents redundancy in testing. It would be also desirable to provide an online product validation system with a remote automated testing capability, which can improve efficiency and reduce ambiguity in testing by performing a set of tasks repeatedly without user intervention.

SUMMARY OF THE INVENTION

Accordingly, the present invention provides an online product validation solution with an integrated remote test automation module.

In an aspect of the present invention, an online production validation system may include a host server comprising an online testing module configured to provide a web-based user interface. The online testing module may display a graphic user interface displaying a list of each procedure run in specific conditions. The online testing module may record the results of each procedure. The host server may include a centralized knowledge database storing history of specific testing practices. Thus, a user may reference past test results and verify the exact procedures and expected results of a test case on a specific system. The user may enter test cases to run on a test system and check for specific defects in the software or hardware product.

In another aspect of the present invention, the online production validation system may include a remote test automation module. The remote test automation module may reside in a test system which is communicatively coupled to the host server over a network. The online testing module is configured to assist a user in creating a test plan, display a proper graphic user interface by consulting the knowledge data base, and generate a script file based on the created test plan. The user may input desired test procedures, hardware and software configurations, and the like through the graphic user interface.

The online testing module may generate a script file based on the created test cases. The generated script file may be sent from the online testing module to the remote test automation module. The remote test automation module may execute a test case based on the script file, and send a result of the executed test case to the online test module. Advantageously, the host server may display a progress of the test case in real time while the remote test automation module executes each step in the test case. The displayed progress of the test case may include running, paused, passed and failed status of each step in the test case.

In an advantageous aspect of the present invention, the remote test automation module may be able to perform such tasks in a fraction of the time with more consistent results than a human tester. Thus, the remote test automation module may improve efficiency and reduce ambiguity in testing by performing a set of tasks repeatedly without user intervention. Further, such task offloading may allow the tester to spend less time idly monitoring systems for errors and more time proactively searching for issues.

In another advantageous aspect of the present invention, the online product validation system may capitalize on testing resources by taking advantage of non-business hours, such as evenings, weekends and holidays to accomplish testing in the time that would have not been utilized. The online product validation system may reproduce tests with no ambiguity and record every detail of the results. The online product validation system may be utilized as a test case prototyping tool through automating a test case in real-time as the test is executed.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention is directed to an online product validation solution integrating an online testing module configured to assist a user to create test cases and a remote test automation module configured to execute the created test cases on remote test systems. The present invention may generate complete functional product specifications based upon existing marketing level requirements. A centralized knowledge database storing previously built test cases and various specifications may also provide consistency for future specifications. As such, when a user creates a test plan, complete test coverage for the test plan may be ensured and cross-checked with product specifications stored in the knowledge database.

A user may be able to generate various levels of tests such as an automated test, a semi-automated test, a manual test or the like. Moreover, seamless integration of the online testing module and the remote test automation module may provide a uniform interface for generating both manual and automated test cases. The created test cases may be used by other users and be utilized for customization and categorization for future products. The present invention may provide various reports regarding the test case. The test case results may be reported from the remote test automation module and displayed through a GUI with open text fields for details. The test case results may also include file attachments if necessary for supplementary test records. Additionally, a test case status may be reported within the test plan in real time with test case execution. Defects reported against the product under test may be traceable to the test case from which it had originated. Test case histories may be also available for defect analysis as well as overall test case effectiveness.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Referring generally now to FIGS. 1 through 8, exemplary embodiments of the present invention are shown.

Figure 1:
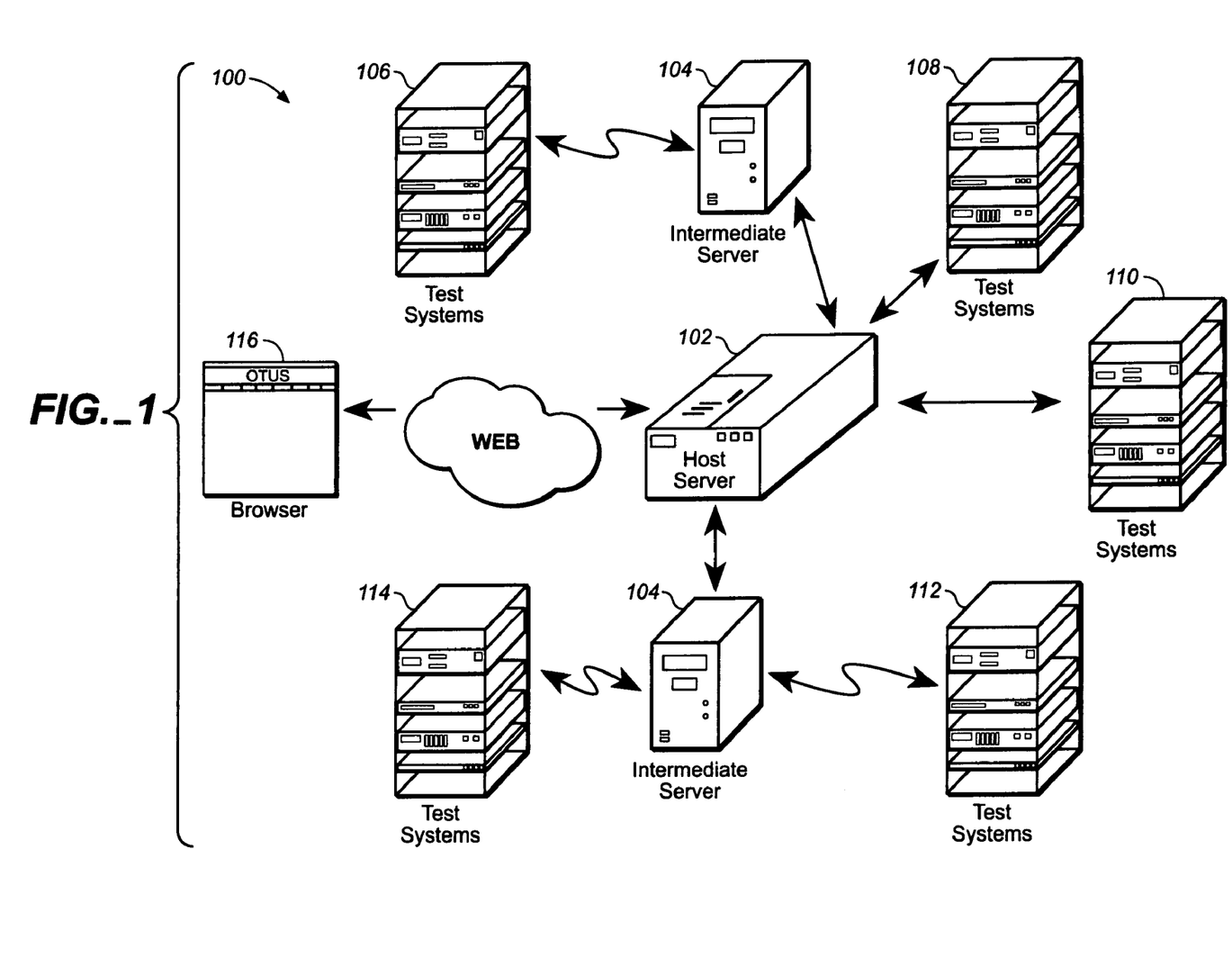
FIG. 1 is an illustration of a block diagram of an online testing system environment in accordance with an exemplary embodiment of the present invention.

Referring now to FIG. 1, a block diagram 100 of an online product validation system environment in accordance with an exemplary embodiment of the present invention is shown. In an embodiment of the present invention, a host server 102 may provide a test plan to each designated test systems 104-114. Each test system may run the test plan provided by the host server 102 and return the result of the test plan back to the host server 102. When the test system cannot communicate with the host server directly, the test system and the host server may communicate with each other through an intermediate server 104. The host server 102 also provides a web-based interface for users. As such, users may access the host server using the web interface where they can view the status of automated tests on the test systems.

Figure 2:
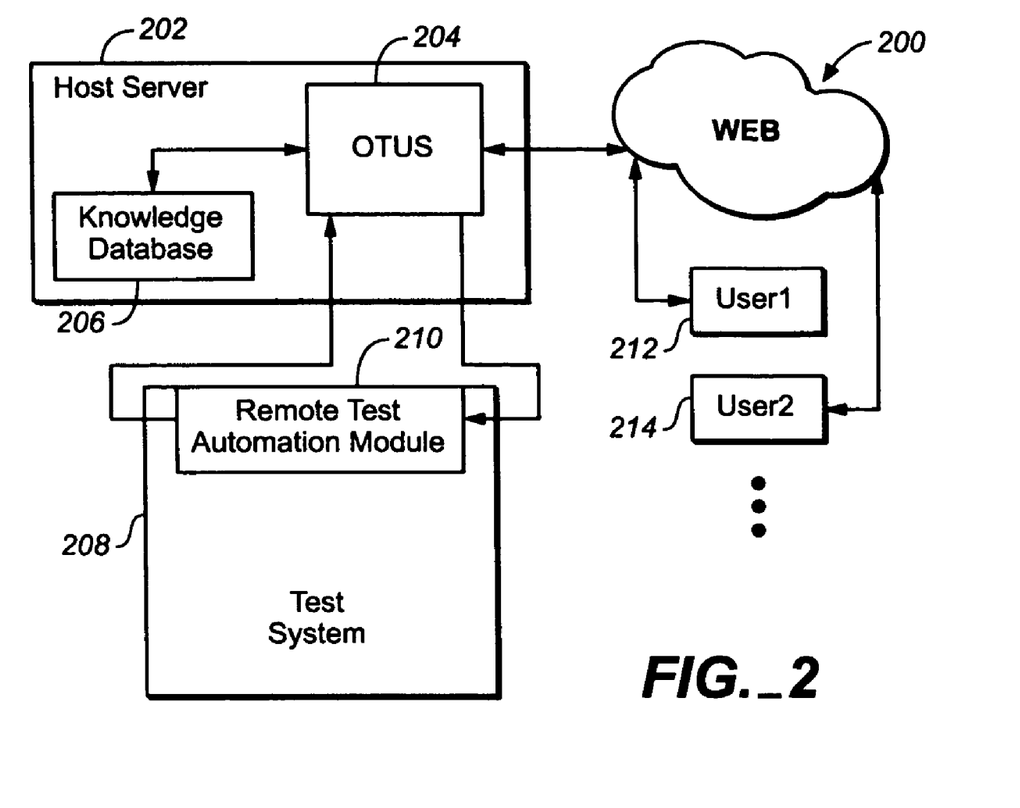
FIG. 2 is an illustration of a block diagram of an online testing system in accordance with an exemplary embodiment of the present invention.

Referring now to FIG. 2, a block diagram 200 of an online product validation system in accordance with an exemplary embodiment of the present invention is shown. The online product validation service may comprise a host server 202 which is communicatively coupled to a testing system 208. The host server 202 may include an online unification testing system (OTUS) module 204 and a knowledge database 206. The OTUS module 204 may provide a web-based graphic user interface. The host server 202 may assist a user to create test cases by creating step-by-step procedures and by providing expected results which may define a method to validate a feature. The user may create test cases though a graphic user interface (GUI) comprising a simple form describing the name, description, steps, and results of the test case. Once test cases are created in the host server 202, the test cases may be added into a knowledge database 206. Any user may be able to search and use previously created test cases for testing a product. The user may add test cases to a test plan, which is a collection of test cases, meant to be tested over a certain period.

In an embodiment of the present invention, each test case may be converted to a script file which is suitable for being understood by the remote test automation module. In a particular embodiment of the present invention, the script file may be based on XML file format or the like. A corresponding script is generated for each test case when a user selects a desired action from a GUI. The GUI may display a list of available test procedures and receive user selections. The create test case may be added into the knowledge database so that other users can utilize the test case in the future. Advantageously, the OTUS module may automatically calculate the estimated execution time and configuration prerequisites and include this information within the test case attributes.

Figure 3:
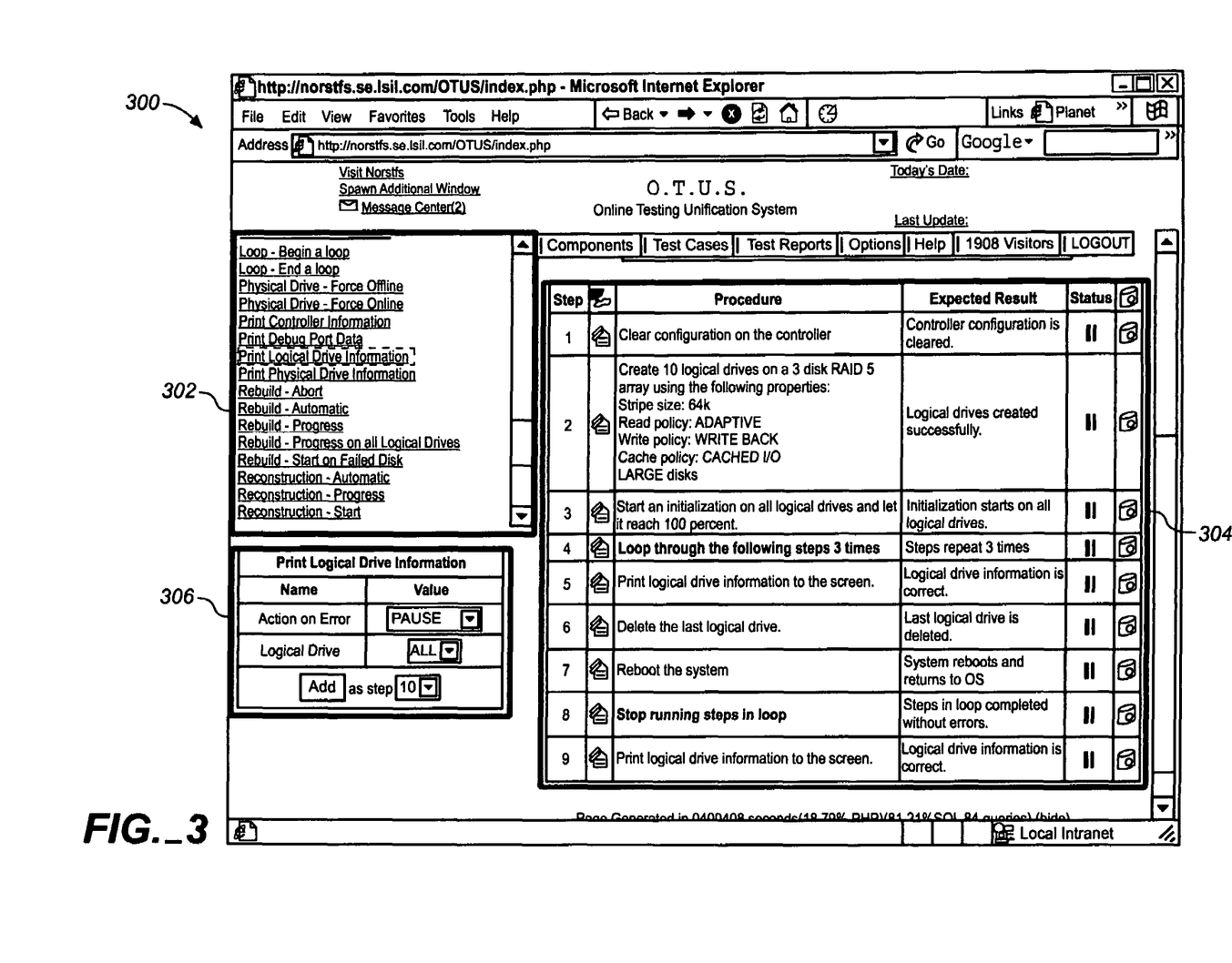
FIG. 3 is an illustration of a graphic user interface screen in accordance with an exemplary embodiment of the present invention.

Referring now to FIG. 3, a GUI screen 300 through which a user can create test cases is shown. The GUI 300 may display test cases that are to be executed on the remote test system. A list of the available automated steps 302 may be displayed. When a user selects a step from the list of the available automated steps 302, the GUI 300 may display the selected step and its associated parameters 306. Advantageously, the user may have options of adjusting the step parameters. The created test steps 304 may be added to the script file in any order, edited and deleted. A corresponding script of each test step may be included in the script file generated for each test case when a user selects a desired action from the GUI 300.

Referring back to FIG. 2, the script file may be sent to a designated remote test system 208 which includes a remote test automation module. The remote test automation module may execute each test step in accordance with the received script file. The host server 202 may receive a result of the test in progress and informational messages from the remote test automation module. The OTUS module may display a report including a completion percentage of the test, runtime metrics, or the like, based on the received result of the test in progress.

Figure 4:
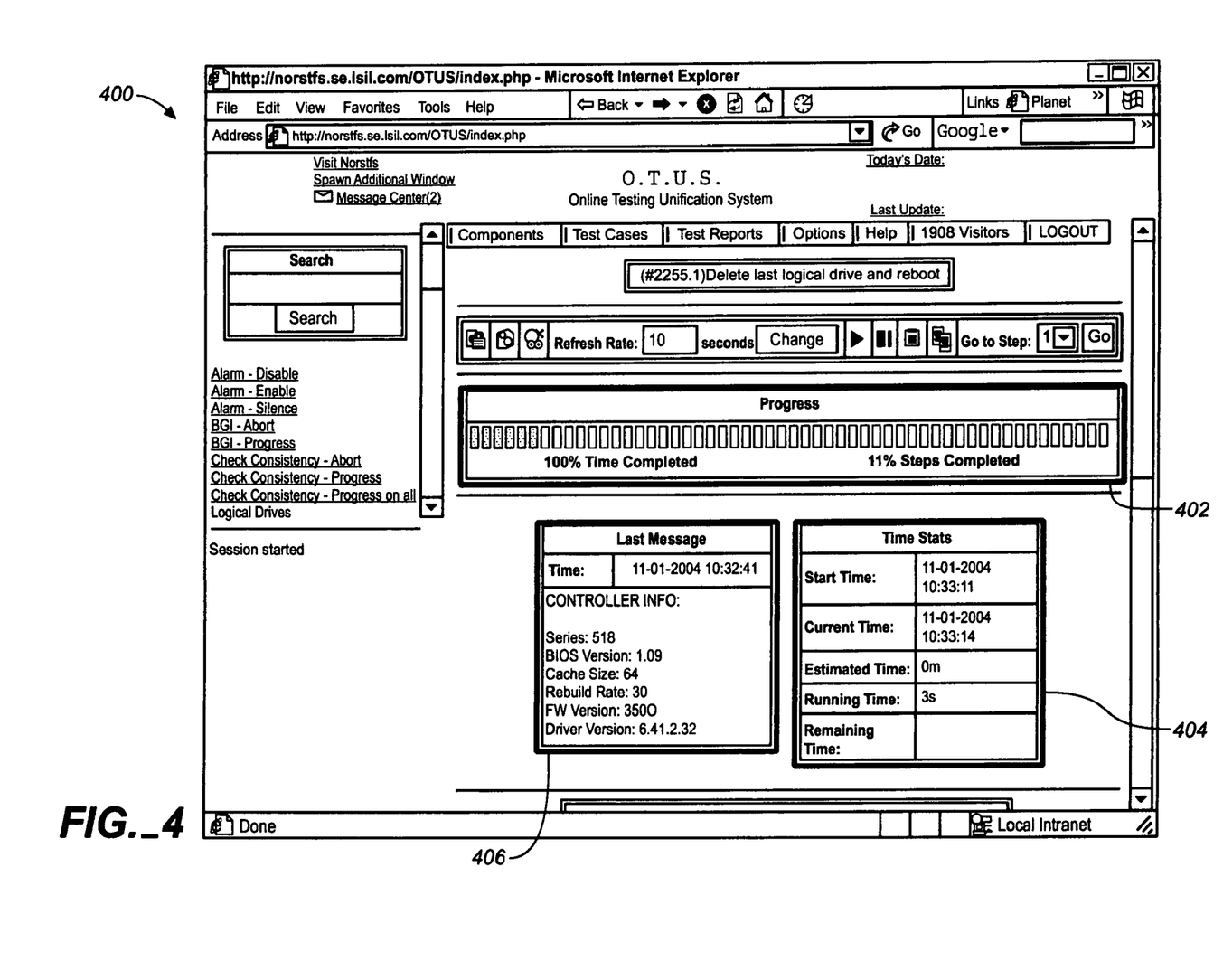
FIG. 4 is an illustration of a test progress status screen in accordance with an exemplary embodiment of the present invention.

Referring now to FIG. 4, an illustration of a test progress status screen 400 is shown. The OTUS module may display a progress (e.g. percent complete or the like) 402, runtime metrics 404 and an informational message 406 sent from the remote test automation module. Additionally, the user may be able to view the log file containing full details of each step through another GUI interface provided by the OTUS module.

Figure 5:
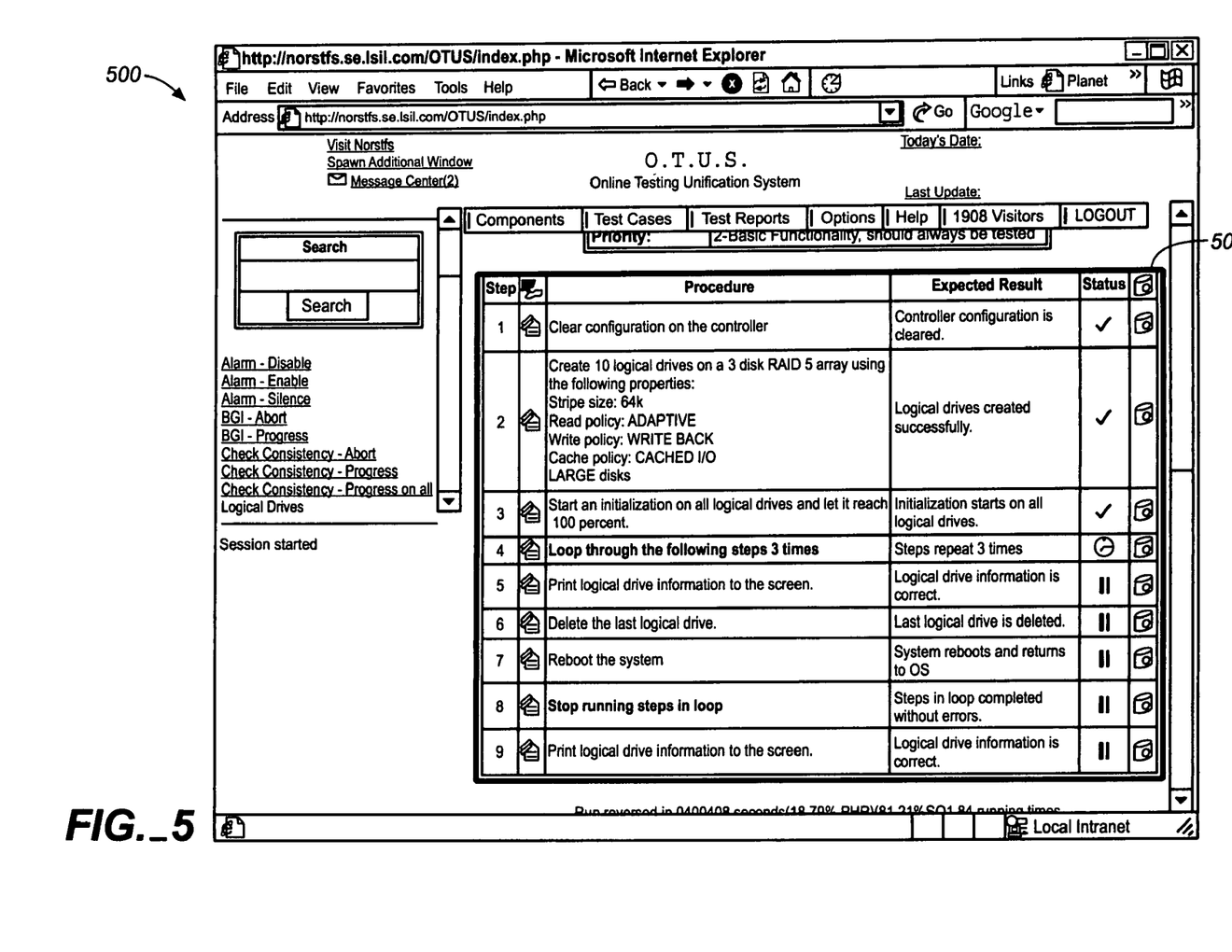
FIG. 5 is an illustration of a test step status screen in accordance with an exemplary embodiment of the present invention.

The OTUS module may display the status of each step indicating that the step is passed, failed, running or paused. The user may be able to select a test case running in any test system coupled to the host server to view the current status of the test case. Referring now to FIG. 5, a test step screen 500 is shown. In an embodiment of the present invention, a status 502 of each test step may be represented by an icon. Each icon may indicate that a test step may be passed, failed, running, paused, investigated, or the like. The test step screen may display each step, expected result, and status of the test step.

Moreover, various test case results may be reported in a consistent format using predefined requisite fields, open text fields for details and can also include file attachments if necessary for supplementary test records. Defects that are reported against the product under test may be traceable to the test case from which it had originated. Test case histories may be also available for defect analysis as well as overall test case effectiveness.

Figure 6:
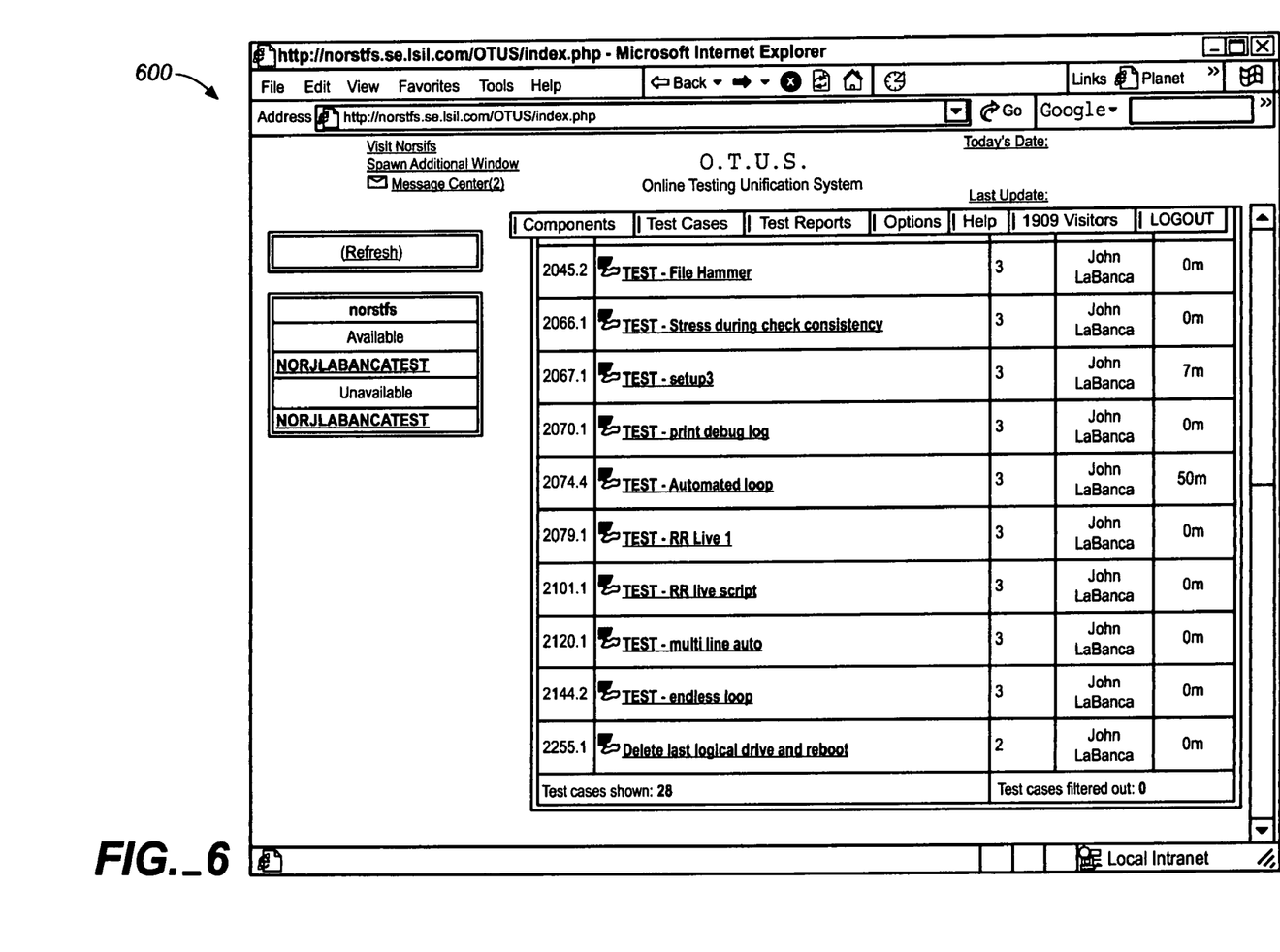
FIG. 6 is an illustration of an automated test search screen in accordance with an exemplary embodiment of the present invention.

A user may be able to select an available test plan from the knowledge base. As such, a GUI may be provided, which allows the user to search for a specific test plan or test cases based on multiple test attributes including name, content, and level of automation. Referring now to FIG. 6, an automated test search screen 600 is shown. The remote test automation module may improve efficiency and reduce ambiguity in testing by performing a set of tasks repeatedly without user intervention.

Figure 7:
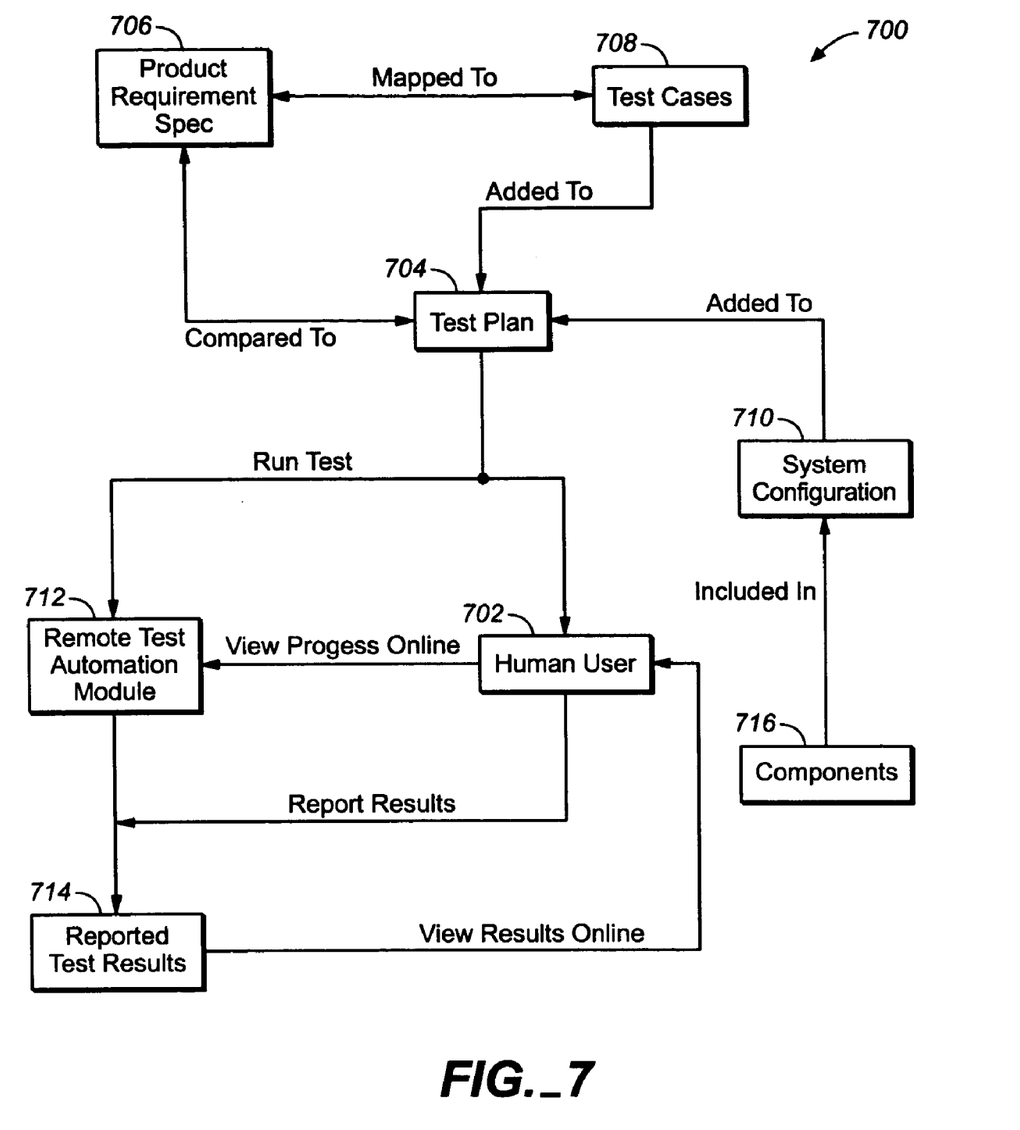
FIG. 7 is an illustration of a relationship diagram of the online production validation system in accordance with an exemplary embodiment of the present invention.

Referring now to FIG. 7, a relationship diagram 700 of the online production validation system is shown. In an embodiment of the present invention, a centralized knowledge database may store previously built test cases 708 and various specifications 706. When a user 702 creates a test plan 704, the user may add specific system configuration 710 to the test plan by defining various components 716 such as the exact system, products, hardware and software to use. Product requirement specifications 706 stored in the knowledge database may be compared to the test plan. If necessary, previously built test cases 708 may be mapped with the product requirement specifications 706 and then added to the test plan 702. The test plan 704 may be converted to several script files which are suitable for being understood by the remote test automation module 712. The remote test automation module 712 executes the script files and sends reported test results 714 back to the user 702. The user 702 may view the test progress and various reports through GUIs. In this manner, the complete test coverage for the test plan may be ensured and cross-checked with product specifications stored in the knowledge database.

Figure 8:
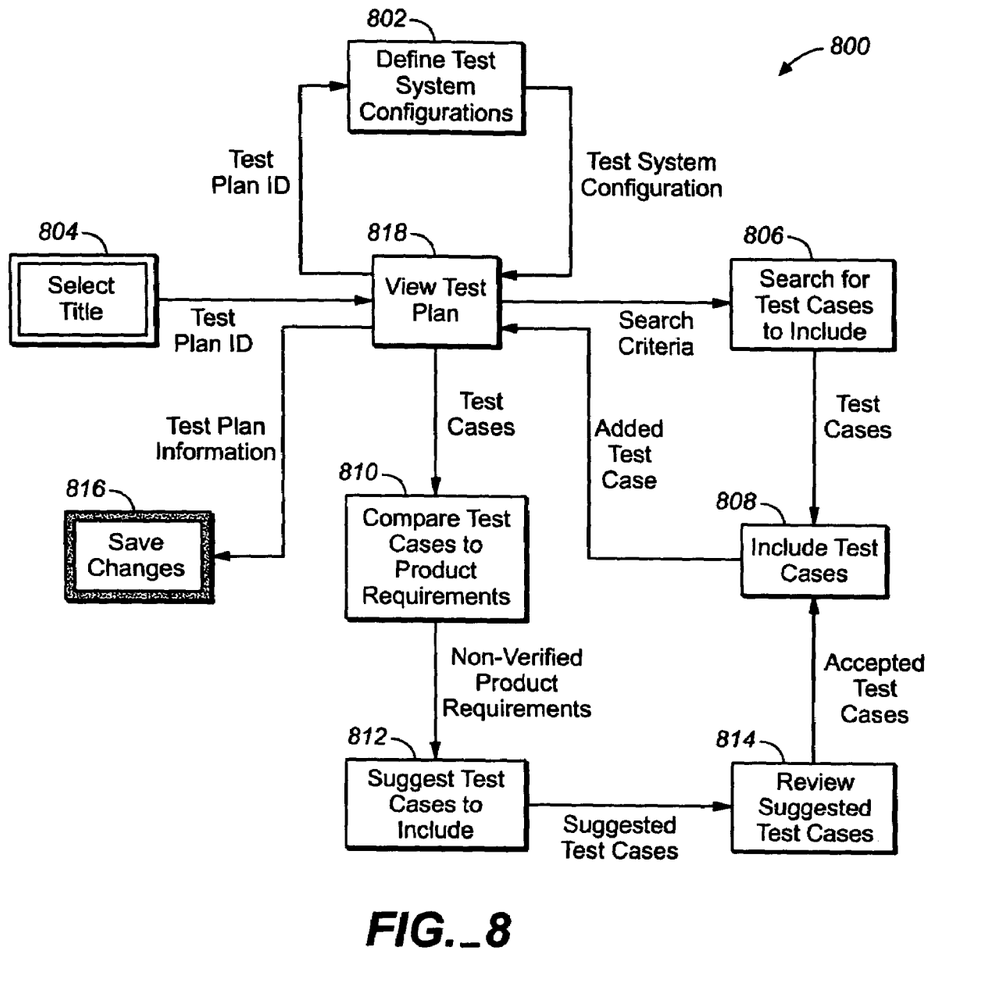
FIG. 8 is an illustration of a flow diagram of the online production validation system in accordance with an exemplary embodiment of the present invention.

Referring now to FIG. 8, a flow diagram 800 of the online product validation system when a user creates a test plan is shown. In a particular embodiment, a test plan may be a collection of test cases divided into system configurations aimed at validating one or more products. For example, a test plan may include ten system configurations describing all systems supported by a customer, as well as numerous test cases to validate each operation on a product.

The online production validation system may assist a user to define test system configurations 802. When the user selects a title for a test plan 804, the online production validation system may assign a test plan ID for the test plan. The user may be able to search previously created test cases in order to build the test plan for the test system 806. The online production validation system may include the searched test cases to the test plan 808. Then, the online production validation system may compare all test cases included in the test plan and product requirements stored in the knowledge database 810. When there is any product requirement which may not be verified through the test cases included in the test plan, the online production validation system may suggest possible test cases for the non-verified product requirement 812. The user may review the suggested test cases and accept or reject the suggested test cases 814. The suggested test cases may be included in the test plan if the user accepts the suggestion 808. The online production validation system may store test plan information and update the information when there is any change in the test plan 816. The user may be able to view various steps involved in creating the test plan 818.

In an embodiment of the present invention, a test plan included in the knowledge database may consist of a collection of test cases categorized into various test environments. The OTUS module may send the test cases to a remote system and collect a result of test case execution sent from the remote test automation module. The results of the test cases may be stored in the knowledge database. The test plan may be updated to reflect the status of the test case. The OTUS module may also provide a view of overall progress of multiple product validation test suites simultaneously. Moreover, The OTUS module may track individual components, such as software and hardware, used during testing.

In an embodiment of the present invention, the OTUS module may include an Automated Test Execution with Intelligence (ATE-I) module which executes entire test plans. The ATE-I module may be configured to identify the nature of the test cases (automated/manual/semi-automated) and execute the test cases that meet predefined criteria. The ATE-I may insert specified test procedures between each test case execution as well as provide randomized execution.

Advantageously, the present invention may provide many useful features. A user may remotely start, stop, and resume test case execution on a specific test system through a remote test automation module coupled to the specific test system. Since OTUS module provides a web-based user interface, the user may view a test progress and a log file through any web browser. The test system may be separated from a monitoring location. The OTUS may allow a user to monitor the status of multiple concurrent tests simultaneously. Moreover, when an unexpected result occurs, the user may be alerted via alarms and email ensuring prompt actions.

The present invention may capitalize on testing resources by taking advantage of non-business hours, such as evenings, weekends and holidays to accomplish testing in the time that would have not been utilized. The present invention may be utilized as a test case prototyping tool through automating a test case in real-time as the test is executed (record/playback capability).

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the online product validation system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for an online testing unification system, comprising:
   creating a test plan for a test system, the test plan including a plurality of test cases, said creating a test plan including:
      defining system configurations of the test system;
      searching for appropriate test cases based on the defined system configurations;
      assisting a creation of a user-created test case;
      storing the appropriate test cases and the user-created test case in the knowledge database;
      including the appropriate test cases and the user-created test case to the test plan;
      retrieving a product requirement of the test system from a knowledge base;
      checking whether the retrieved product requirement is not verified through the test plan;
      determining a possible test case for the non-verified product requirement;
      reviewing the possible test case for the non-verified product requirement; and
      including the reviewed possible test case to the test plan if it is acceptable, wherein the product requirement of the test system and the possible test case are stored in the knowledge database;
   generating a script file based on each of the plurality of test cases;
   estimating execution time and configuration prerequisite of the execution of the script file;
   executing the script file in a remote test system;
   displaying progress of the corresponding test case in real time with execution of the script file, said displaying progress including a completion percentage of the test plan, a listing of each test step and an icon representing status of each test step;
   storing results of the execution of the script file in a knowledge database;
   storing the created test plan in the knowledge database, wherein the online testing unification system includes an automated test execution with intelligence (ATE-I) module which executes an entire test plan, the ATE-I module being configured to identify a type of test case from at least one of automated, manual or semi-automated and executing the test cases to meet predefined criteria, the ATE-I module being further configured to insert test procedures between execution of each test case and to randomize test case execution;
   reporting results of the execution of the script file, where the reporting includes a set of predefined requisite fields and an open text field for result details; and
   providing test histories for performing at least one of a defect analysis or an overall test case effectiveness analysis.

2. The method as described in claim 1, wherein the progress of the corresponding test case includes running, paused, passed, failed, and investigated status of each step in the corresponding test case.

3. The method as described in claim 1, further comprising:
   forwarding results of the execution of the script file to a user.

4. The method as described in claim 3, wherein forwarding results of the execution of the script file to a user comprises sending an electronic message to a user.

5. The method as claimed in claim 1, further comprising:
   generating a set of functional product specifications based on a set of existing marking level requirements.

6. A method for an online testing unification system, comprising:
   creating a test plan for a test system, the test plan including a plurality of test cases, said creating a test plan including:
      defining system configurations of the test system;
      searching for appropriate test cases based on the defined system configurations;
      assisting a creation of a user-created test case;
      storing the appropriate test cases and the user-created test case in the knowledge database;
      including the appropriate test cases and the user-created test case to the test plan;
      retrieving a product requirement of the test system from a knowledge base;
      checking whether the retrieved product requirement is not verified through the test plan;
      determining a possible test case for the non-verified product requirement;
      reviewing the possible test case for the non-verified product requirement; and
      including the reviewed possible test case to the test plan if it is acceptable, wherein the product requirement of the test system and the possible test case are stored in the knowledge database;
   generating a script file based on each of the plurality of test cases;
   estimating execution time and configuration prerequisite of the execution of the script file;
   executing the script file in a remote test system;
   displaying progress of the corresponding test case in real time with execution of the script file, said displaying progress including a completion percentage of the test plan, a listing of each test step and an icon representing status of each test step;
   storing results of the execution of the script file in a knowledge database, wherein the online testing unification system includes an automated test execution with intelligence (ATE-I) module which executes an entire test plan, the ATE-I module being configured to identify a type of test case from at least one of automated, manual or semi-automated and executing the test cases to meet predefined criteria, the ATE-I module being further configured to insert test procedures between execution of each test case and to randomize test case execution;
   reporting results of the execution of the script file, where the reporting includes a set of predefined requisite fields and an open text field for result details; and
   providing test histories for performing at least one of a defect analysis or an overall test case effectiveness analysis.

7. The method as claimed in claim 6, wherein said icon representing status of each test step includes at least one of passed, failed, running, paused or investigated.

8. The method as claimed in claim 6, further comprising:
   generating a set of functional product specifications based on a set of existing marking level requirements.

9. A method for an online testing unification system, comprising:
creating a test plan for a test system, the test plan including a plurality of test cases, said creating a test plan including:
defining system configurations of the test system;
searching for appropriate test cases based on the defined system configurations;
assisting a creation of a user-created test case;
storing the appropriate test cases and the user-created test case in the knowledge database;
including the appropriate test cases and the user-created test case to the test plan;
retrieving a product requirement of the test system from a knowledge base;
checking whether the retrieved product requirement is not verified through the test plan;
determining a possible test case for the non-verified product requirement;
reviewing the possible test case for the non-verified product requirement; and
including the reviewed possible test case to the test plan if it is acceptable, wherein the product requirement of the test system and the possible test case are stored in the knowledge database;
generating a script file based on each of the plurality of test cases;
estimating execution time and configuration prerequisite of the execution of the script file;
executing the script file in a remote test system;
displaying progress of the corresponding test case in real time with execution of the script file, said displaying progress including a completion percentage of the test plan, a listing of each test step, expected result and an icon representing status of each test step;
storing results of the execution of the script file in a knowledge database;
forwarding results of the execution of the script file to a user, wherein the online testing unification system includes an automated test execution with intelligence (ATE-I) module which executes an entire test plan, the ATE-I module being configured to identify a type of test case from at least one of automated, manual or semi-automated and executing the test cases to meet predefined criteria, the ATE-I module inserting test procedures between execution of each test case, the ATE-I module being further configured to insert test procedures between execution of each test case and to randomize test case execution;
reporting results of the execution of the script file, where the reporting includes a set of predefined requisite fields and an open text field for result details; and
providing test histories for performing at least one of a defect analysis or an overall test case effectiveness analysis.

10. The method as claimed in claim 9, wherein said icon representing status of each test step includes at least one of passed, failed, running, paused or investigated.

11. The method as claimed in claim 9, further comprising:
generating a set of functional product specifications based on a set of existing marking level requirements.

* * * * *